US012556337B2

(12) United States Patent
Lei et al.

(10) Patent No.: US 12,556,337 B2
(45) Date of Patent: Feb. 17, 2026

(54) BANDWIDTH PART MAPPING FOR CONTROL AND DATA CHANNELS

(71) Applicant: QUALCOMM Incorporated, San Diego, CA (US)

(72) Inventors: Jing Lei, San Diego, CA (US); Wanshi Chen, San Diego, CA (US); Chao Wei, Beijing (CN); Huilin Xu, Temecula, CA (US); Peter Pui Lok Ang, San Diego, CA (US); Linhai He, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 17/759,533

(22) PCT Filed: Mar. 4, 2020

(86) PCT No.: PCT/CN2020/077688
§ 371 (c)(1),
(2) Date: Jul. 27, 2022

(87) PCT Pub. No.: WO2021/174432
PCT Pub. Date: Sep. 10, 2021

(65) Prior Publication Data
US 2023/0091795 A1    Mar. 23, 2023

(51) Int. Cl.
*H04L 5/00* (2006.01)
(52) U.S. Cl.
CPC .......... *H04L 5/0053* (2013.01); *H04L 5/0092* (2013.01)

(58) Field of Classification Search
CPC ....... H04L 5/0053; H04L 5/0092; H04L 1/08; H04L 5/0094; H04L 5/001; H04L 5/0007;
(Continued)

(56) References Cited

U.S. PATENT DOCUMENTS

2018/0098317 A1*  4/2018  Akkarakaran ............ H04L 1/00
2018/0324830 A1* 11/2018  Islam ................... H04L 5/0053
(Continued)

FOREIGN PATENT DOCUMENTS

WO     2020030688 A1   2/2020

OTHER PUBLICATIONS

Fraunhofer HHI et al: "Design for NR V2X Physical Channels", R1-1810484, 3GPP TSG RAN WG1 Meeting #94bis, 3rd Generation Partnership Project, Mobile Competence Centre, 650, Route Des Lucioles, F-06921 Sophia-Antipolis Cedex, France, vol. RAN WG1, No. Chengdu, China, Oct. 8, 2018-Oct. 12, 2018, Retreived on Sep. 28, 2018, XP051517892, 8 Pages, Section 3.2.
(Continued)

*Primary Examiner* — John D Blanton
(74) *Attorney, Agent, or Firm* — Harrity & Harrity, LLP

(57) ABSTRACT

Various aspects of the present disclosure generally relate to wireless communication. In some aspects, a user equipment (UE) may communicate on a physical control channel in a control bandwidth part (BWP) based at least in part on a mapping of the physical control channel to the control BWP, and communicate on a physical shared channel in a data BWP based at least in part on a mapping of the physical shared channel to the data BWP. Numerous other aspects are provided.

34 Claims, 9 Drawing Sheets

(58) Field of Classification Search
CPC ........... H04L 2001/0097; H04L 5/0048; H04L 5/0044; H04W 72/1263; Y02D 30/70
See application file for complete search history.

(56) References Cited

U.S. PATENT DOCUMENTS

| | | | | |
|---|---|---|---|---|
| 2019/0273637 | A1 | 9/2019 | Zhang et al. | |
| 2020/0045707 | A1 | 2/2020 | Hwang et al. | |
| 2020/0045708 | A1 | 2/2020 | Hwang et al. | |
| 2020/0120584 | A1* | 4/2020 | Yi | H04L 5/0048 |
| 2020/0169991 | A1* | 5/2020 | Lin | H04W 72/56 |
| 2020/0205150 | A1* | 6/2020 | Cheng | H04W 72/21 |
| 2020/0221308 | A1* | 7/2020 | Liao | H04W 74/0833 |
| 2020/0344030 | A1* | 10/2020 | Cheng | H04W 72/0453 |
| 2020/0404690 | A1* | 12/2020 | Lee | H04L 5/001 |
| 2021/0368448 | A1* | 11/2021 | Li | H04W 72/0453 |
| 2022/0279543 | A1* | 9/2022 | Yoshioka | H04W 72/0446 |
| 2022/0330133 | A1* | 10/2022 | Chen | H04W 36/0061 |
| 2022/0353898 | A1* | 11/2022 | Li | H04L 1/1887 |
| 2022/0377770 | A1* | 11/2022 | Li | H04W 72/1273 |
| 2022/0386156 | A1* | 12/2022 | Park | H04W 24/10 |
| 2022/0386331 | A1* | 12/2022 | Aiba | H04L 1/1854 |
| 2022/0386355 | A1* | 12/2022 | Yi | H04W 72/23 |
| 2022/0408470 | A1* | 12/2022 | Jung | H04B 7/06968 |
| 2023/0036564 | A1* | 2/2023 | Bae | H04L 1/1861 |
| 2023/0052764 | A1* | 2/2023 | Zhang | H04L 5/0053 |
| 2023/0066772 | A1* | 3/2023 | Myung | H04B 7/0695 |
| 2023/0067648 | A1* | 3/2023 | Yoshimura | H04W 72/23 |
| 2023/0076897 | A1* | 3/2023 | Svedman | H04L 5/0053 |
| 2023/0091795 | A1* | 3/2023 | Lei | H04L 5/001 370/329 |
| 2023/0144865 | A1* | 5/2023 | Li | H04L 5/005 370/329 |
| 2023/0300790 | A1* | 9/2023 | Jung | H04W 76/10 370/329 |
| 2023/0345314 | A1* | 10/2023 | Harada | H04W 16/32 |
| 2024/0064806 | A1* | 2/2024 | Fu | H04W 72/1268 |
| 2024/0073887 | A1* | 2/2024 | Bae | H04W 72/1268 |

OTHER PUBLICATIONS

Supplementary European Search Report—EP20923154—Search Authority—The Hague—Oct. 30, 2023.

International Search Report and Written Opinion—PCT/CN2020/077688—ISA/EPO—Dec. 9, 2020.

LG Electronics: "Summary #2 on Frame Structure for NR-U", 3GPP TSG RAN WG1 Meeting #95, R1-1814000, Spokane, USA, Nov. 12-16, 2018, Nov. 16, 2018 (Nov. 16, 2018) Section 3, 19 Pages.

LG Electronics: "Summary on Frame Structure for NR-U", 3GPP TSG RAN WG1 Meeting #95, R1-1813928, Spokane, USA, Nov. 12-16, 2018, Nov. 16, 2018 (Nov. 16, 2018) Section 3, 18 Pages.

* cited by examiner

Maximum Aggregation Level Supported for PDCCH in Different CORESET0 Configurations in FR1

| CORESET0 Size (PRB) | CORESET0 Duration (Symbols) | max AL Supported | CORESET0 BW for 15kHz SCS (MHz) | CORESET0 BW for 30 kHz SCS (MHz) |
|---|---|---|---|---|
| 24 | 2 | 8 | 4.32 | 8.64 |
| 24 | 3 | 8 | 4.32 | 8.64 |
| 48 | 1 | 8 | 8.64 | 17.28 |
| 48 | 2 | 16 | 8.64 | 17.28 |
| 48 | 3 | 16 | 8.64 | 17.28 |
| 96 | 1 | 16 | 17.28 | n/a |
| 96 | 2 | 16 | 17.28 | n/a |
| 96 | 3 | 16 | 17.28 | n/a |

FIG. 5

BANDWIDTH PART MAPPING FOR CONTROL AND DATA CHANNELS

CROSS-REFERENCE TO RELATED APPLICATION

This application is a 371 national stage of PCT Application No. PCT/CN2020/077688 filed on Mar. 4, 2020, entitled "BANDWIDTH PART MAPPING FOR CONTROL AND DATA CHANNELS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for bandwidth part mapping for control and data channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include communicating on a physical control channel in a control bandwidth part (BWP) based at least in part on a mapping of the physical control channel to the control BWP, and communicating on a physical shared channel in a data BWP based at least in part on a mapping of the physical shared channel to the data BWP.

In some aspects, a method of wireless communication, performed by a base station, may include communicating on a physical control channel in a control BWP based at least in part on a mapping of the physical control channel to the control BWP; and communicating on a physical shared channel in a data BWP based at least in part on a mapping of the physical shared channel to the data BWP.

In some aspects, a UE for wireless communication may include a memory and one or more processors operatively coupled to the memory. The memory and the one or more processors may be configured to communicate on a physical control channel in a control BWP based at least in part on a mapping of the physical control channel to the control BWP, and communicate on a physical shared channel in a data BWP based at least in part on a mapping of the physical shared channel to the data BWP.

In some aspects, a base station for wireless communication may include a memory and one or more processors operatively coupled to the memory. The memory and the one or more processors may be configured to communicate on a physical control channel in a control BWP based at least in part on a mapping of the physical control channel to the control BWP, and communicate on a physical shared channel in a data BWP based at least in part on a mapping of the physical shared channel to the data BWP.

In some aspects, a non-transitory computer-readable medium may store one or more instructions for wireless communication. The one or more instructions, when executed by one or more processors of a UE, may cause the one or more processors to communicate on a physical control channel in a control BWP based at least in part on a mapping of the physical control channel to the control BWP, and communicate on a physical shared channel in a data BWP based at least in part on a mapping of the physical shared channel to the data BWP.

In some aspects, a non-transitory computer-readable medium may store one or more instructions for wireless communication. The one or more instructions, when executed by one or more processors of a base station, may cause the one or more processors to communicate on a physical control channel in a control BWP based at least in part on a mapping of the physical control channel to the control BWP, and communicate on a physical shared channel in a data BWP based at least in part on a mapping of the physical shared channel to the data BWP.

In some aspects, an apparatus for wireless communication may include means for communicating on a physical control channel in a control BWP based at least in part on a mapping of the physical control channel to the control BWP, and means for communicating on a physical shared channel in a data BWP based at least in part on a mapping of the physical shared channel to the data BWP.

In some aspects, an apparatus for wireless communication may include means for communicating on a physical control channel in a control BWP based at least in part on a mapping of the physical control channel to the control BWP, and means for communicating on a physical shared channel in a data BWP based at least in part on a mapping of the physical shared channel to the data BWP.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating a control resource set configuration table, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
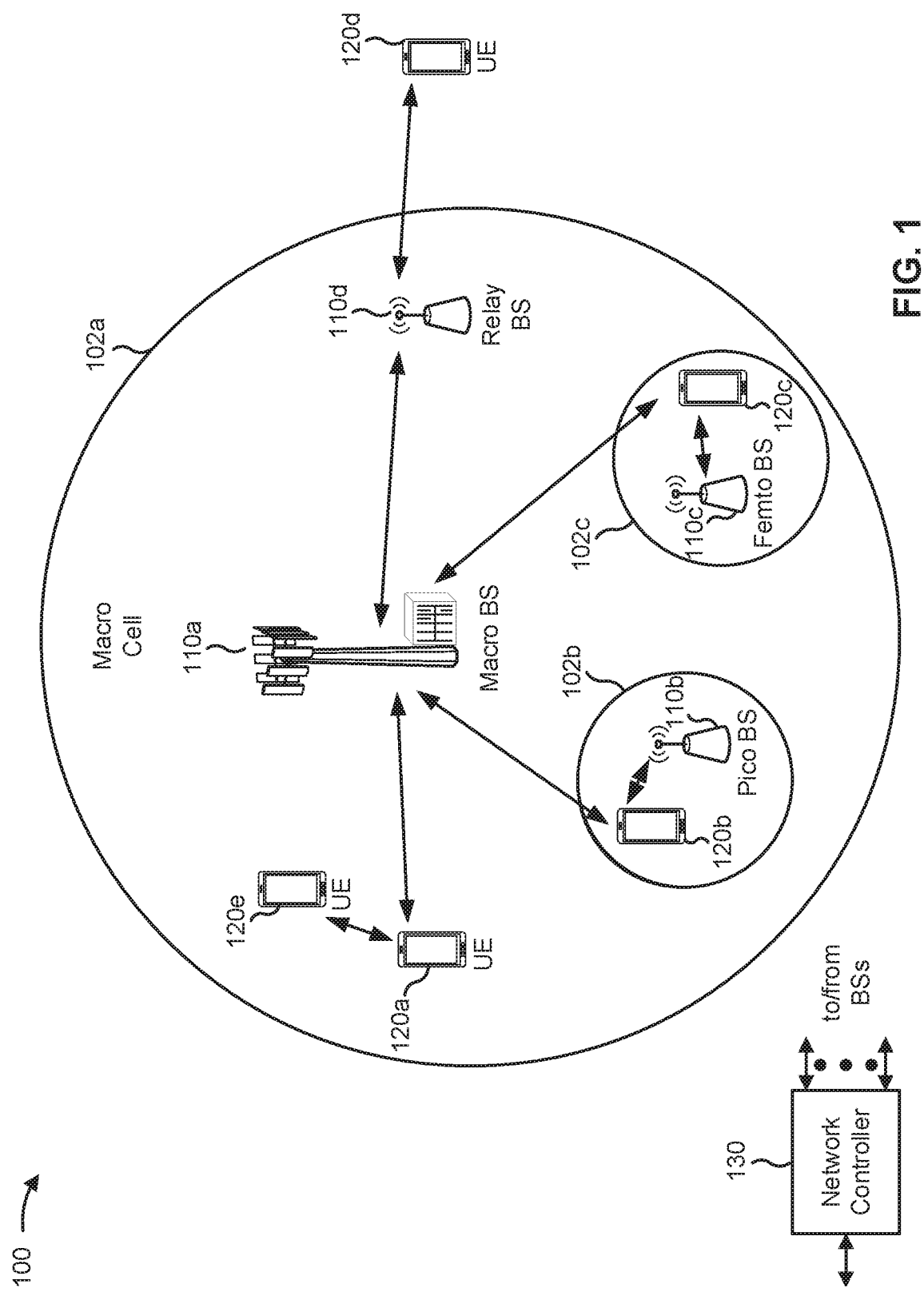
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "g B", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
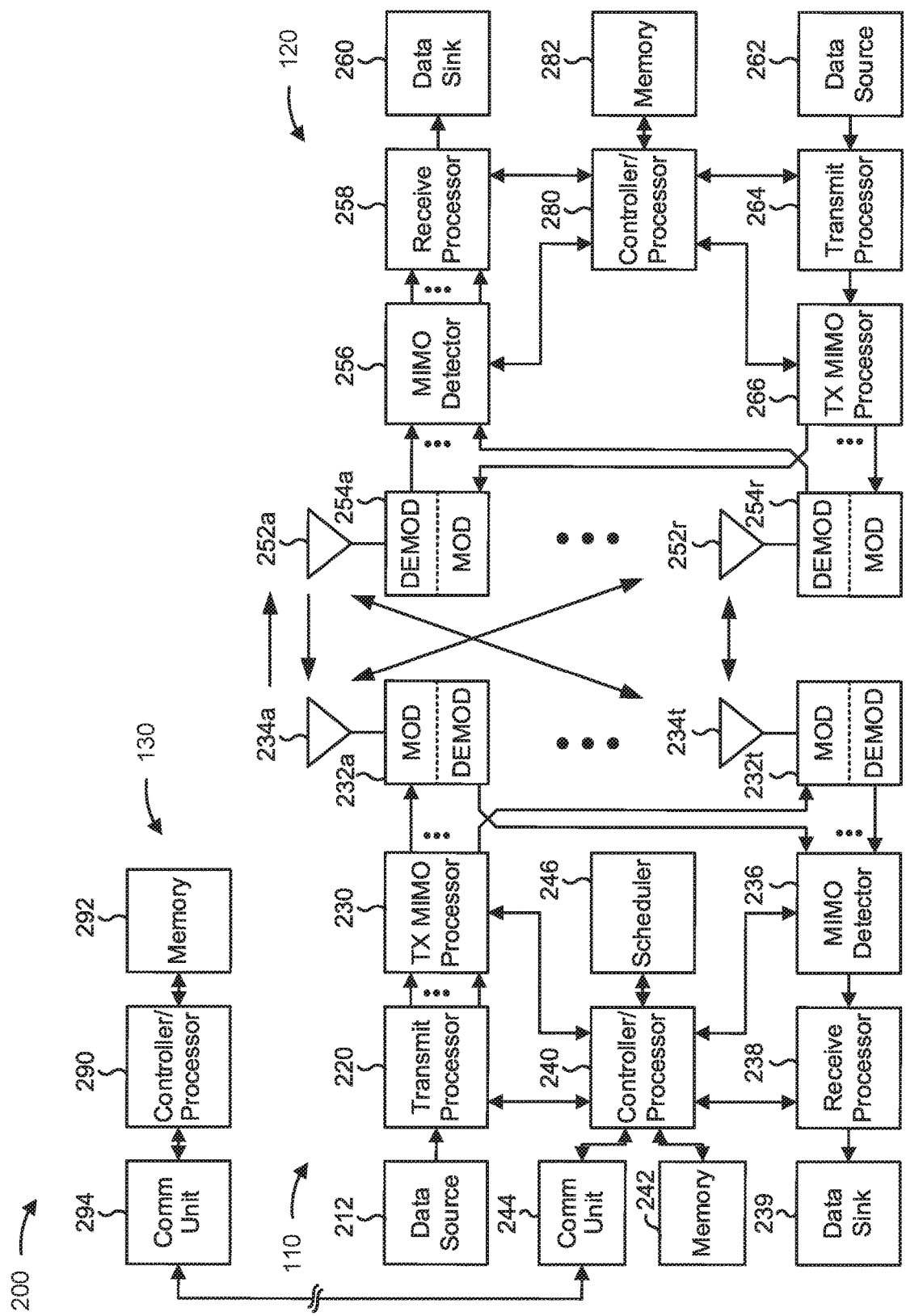
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with bandwidth part (BWP) mapping for control and data channels, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 800 of FIG. 8, process 900 of FIG. 9, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for communicating on a physical control channel in a control BWP based at least in part on a mapping of the physical control channel to the control BWP, means for communicating on a physical shared channel in a data BWP based at least in part on a mapping of the physical shared channel to the data BWP, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for communicating on a physical control channel in a control BWP based at least in part on a mapping of the physical control channel to the control BWP, means for communicating on a physical shared channel in a data BWP based at least in part on a mapping of the physical shared channel to the data BWP, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
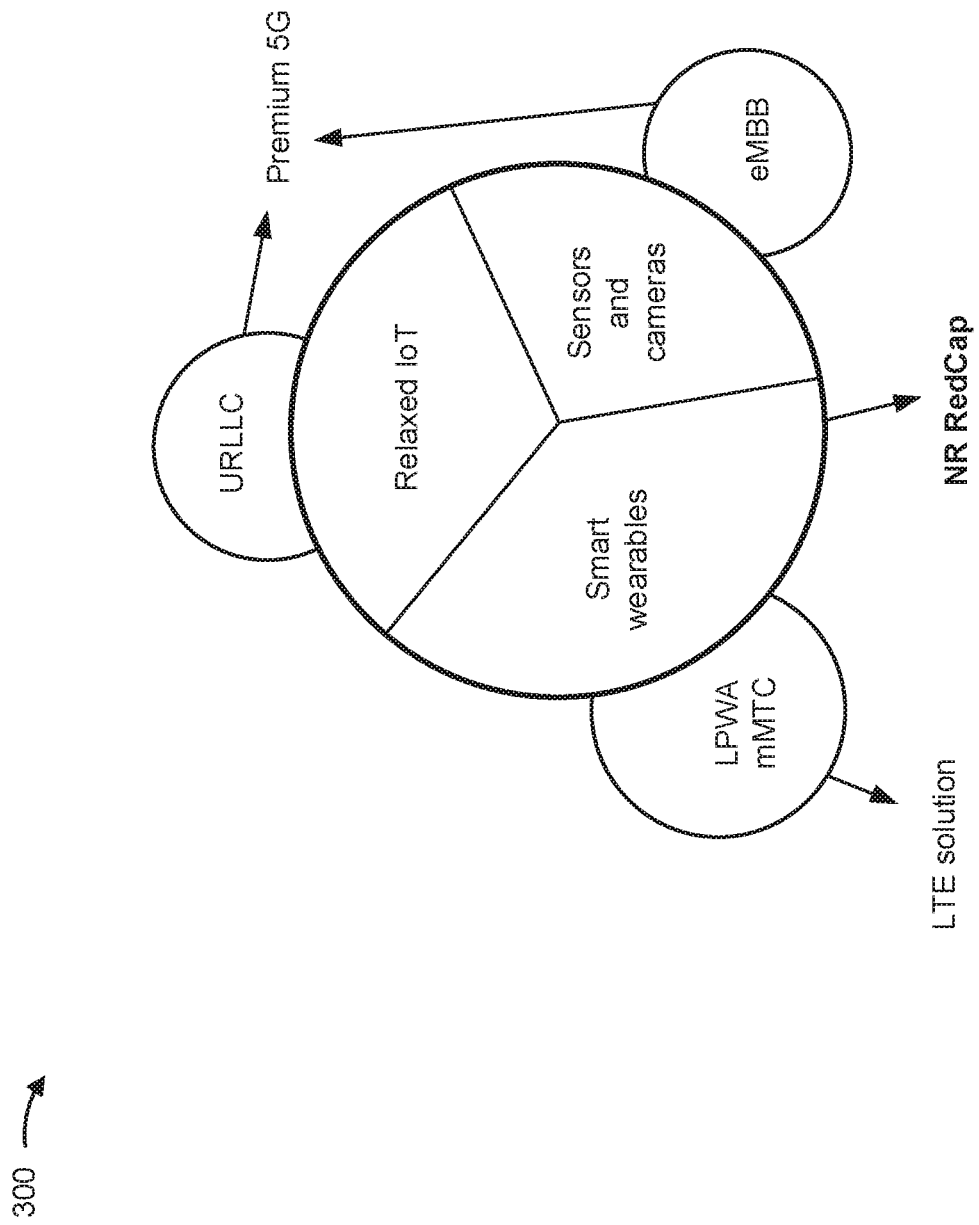
FIG. 3 is a diagram illustrating types of devices, in accordance with various aspects of the present disclosure.

FIG. 3 is a diagram 300 illustrating types of devices, in accordance with various aspects of the present disclosure.

As shown in FIG. 3, ultra-reliable low-latency communication (URLLC) devices and enhanced mobile broadband (eMBB) devices may be considered NR premium devices (e.g., UEs). Some devices, such as low power wide-area (LPWA) devices or massive machine type communication (mMTC) devices, may be considered enhanced LTE devices. FIG. 3 shows that some wireless communication devices are not NR premium UEs, but rather devices with reduced capabilities. Such devices with reduced capabilities may include relaxed internet of things (IoT) devices, smart wearables, sensors, and video surveillance cameras. Reduced capability devices may be referred to as NR RedCap devices, RedCap devices, Red Cap devices, Red- Cap devices, redcap devices, red cap devices, red-cap devices, NR RedCap UEs, and/or the like. NR RedCap devices have also been referred to as NR Light devices or NR Lite devices. For purposes of explanation, the term NR RedCap UE may be used in the aspects described herein.

In some aspects, an NR RedCap UE may have reduced capabilities due to a capability or configuration that provides for less peak throughput, longer latency, less reliability, more power consumption efficiency, less system overhead, less resource costs, and/or the like. An NR RedCap UE may be subject to relaxed latency or reliability requirements. In some aspects, an NR RedCap UE may have only one or two transmission or reception antennas.

In some aspects, an NR RedCap UE may have or be configured to use a subset of features available to NR premium UEs or other full-featured NR UEs that may be used for personal communication. In some aspects, an NR RedCap UE may have a mandatory set of features and an optional set of features, where one or more of the optional features in an NR RedCap UE are mandatory for NR premium UEs. In some aspects, a standard chart or matrix of features may be used to specify whether a device is an NR RedCap UE.

In some aspects, an NR RedCap UE may include wearable devices, such as smart watches, exercise monitors, medical devices, industrial sensors, surveillance cameras, low-end smartphones, low end IoT devices, and/or the like.

As indicated above, FIG. 3 is provided as an example. Other examples may differ from what is described with regard to FIG. 3.

Figure 4:
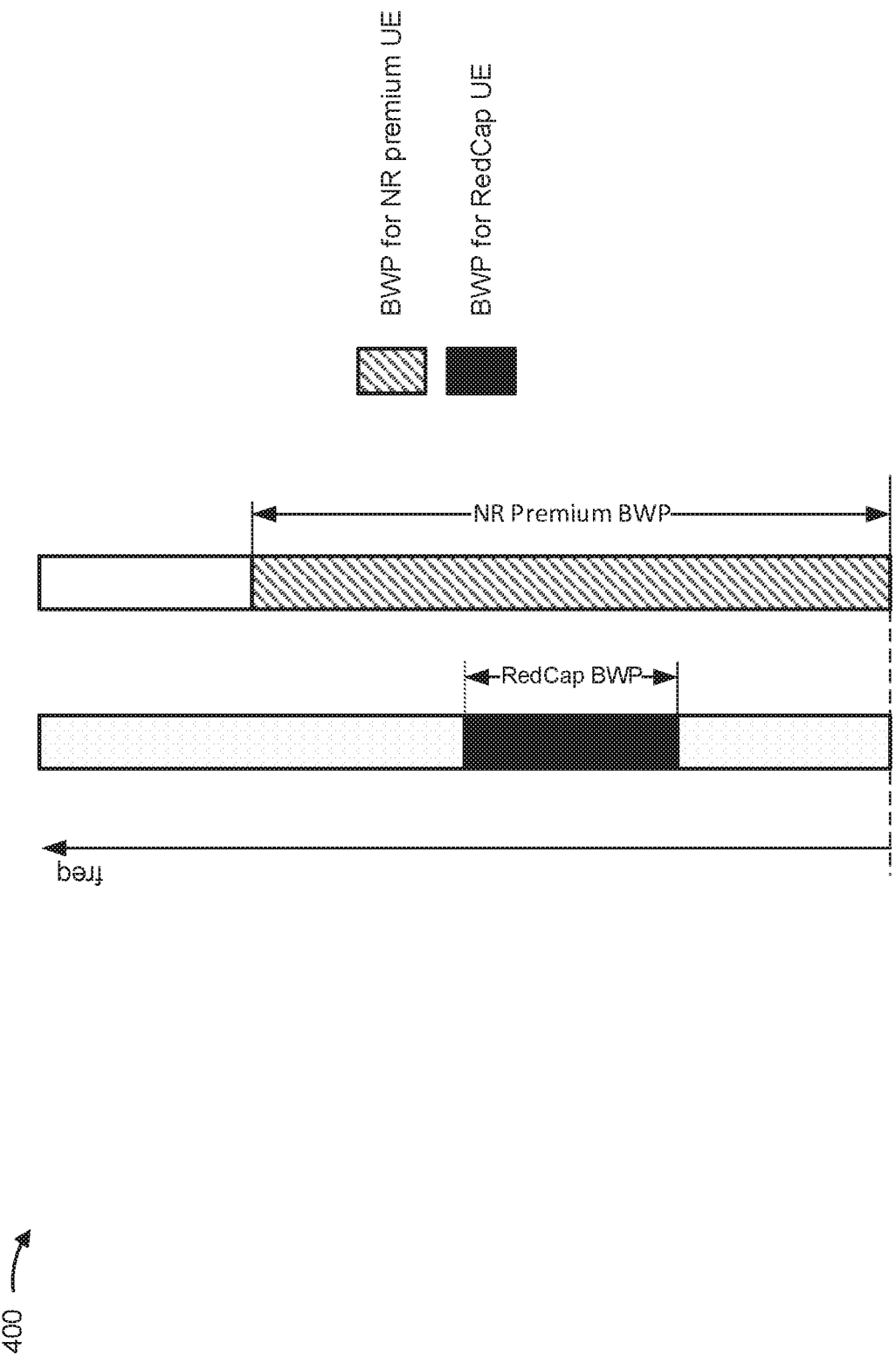
FIG. 4 is a diagram illustrating bandwidth parts (BWPs), in accordance with various aspects of the present disclosure.

FIG. 4 is a diagram 400 illustrating BWPs, in accordance with various aspects of the present disclosure.

A BWP may be a set of contiguous physical resource blocks on a carrier. A BWP allows a UE to transmit or receive with a narrower bandwidth than the entire carrier bandwidth. A UE may have a maximum BWP bandwidth (i.e., maximum channel bandwidth) that the UE may support, and this maximum may be set according to a capability of the UE. NR RedCap UEs may support smaller bandwidths than UEs that are capable of supporting wide bandwidths. For example, an NR RedCap UE may use bandwidths of 5 MHz-20 MHz as compared to an NR premium UE that uses a bandwidth of 50 MHz or 100 MHz. FIG. 4 shows an NR RedCap UE that activates a narrow BWP that is smaller than an NR premium BWP. The NR RedCap UE may not be able to transmit communications on a physical uplink shared channel (PUSCH) or a physical uplink control channel (PUCCH) outside of an active uplink BWP. The NR RedCap UE may not be able to receive communications on a physical downlink shared channel (PDSCH) or a physical downlink control channel (PDCCH) outside of an active downlink BWP.

For some NR UEs, a minimum channel bandwidth on a single component carrier may be related to a frequency band that is used (FR1 or FR2), a number of resource blocks (RBs) configured for a particular core resource set (CORESET), as well a subcarrier spacing (SCS) of Type0-PDCCH. In NR, multiple look up tables (LUTs) may be specified for CORESET0 configurations in FR1 or FR2. For example, one LUT may be for an SCS of 15 kHz for synchronization signals and physical broadcast channel (SSB) broadcasts and an SCS for 15 kHz for PDCCH. The LUT may specify numerous configurations with 24 RBs and 2 or 3 CORESET symbols and numerous configurations with 48 RBs and 1 to 3 CORESET symbols. Another LUT for an SCS of 15 kHz for SSB and an SCS for 30 kHz for PDCCH may specify other configurations for 24 RBs and for 48 RBs. In other words, an NR UE may be required to handle various configurations with different SCSs.

As indicated above, FIG. 4 is provided as an example. Other examples may differ from what is described with regard to FIG. 4.

FIG. 5 is a diagram illustrating a CORESET configuration table 500, in accordance with various aspects of the present disclosure.

Table 500 shows a maximum aggregation level (AL) supported for various PDCCH CORESET0 configurations in FR1. AL is a number of control channel elements that are required to carry one PDCCH. The higher the AL, the greater the probability that a UE can successfully decode downlink control information. With different CORESET0 configurations, a maximum AL for PDCCH may indicate that PDCCH repetition is useful for coverage recovery of an NR RedCap UE with a reduced bandwidth. PDCCH repetition may repeat the same data multiple times for a downlink communication. Multiple repetitions across multiple slots may be referred to as inter-slot repetition. Multiple repetitions in a single slot, and this may be referred to as intra-slot repetition.

Table 500 in FIG. 5 shows that an NR RedCap UE may need to support flexible SCS configurations and achieve a higher frequency diversity gain. However, the UE, being an NR RedCap UE, may have a limited bandwidth and limited capability. If the UE is not able to support the flexible SCS configurations, the UE may experience latency or degraded communications.

According to various aspects described herein, the UE may map a specific BWP to the PDCCH and map a specific BWP to the PDSCH. Similar BWP mappings may also be specified for the PUCCH and the PUSCH channels. By specifying the BWPs separately for a control channel or a data channel, the UE may be able to support SCS flexibility. The UE may also relax switching times between a BWP for the control channel and a BWP for the data channel. As a result, the UE may avoid latency and degraded communications.

As indicated above, FIG. 5 is provided as an example. Other examples may differ from what is described with regard to FIG. 5.

Figure 6:
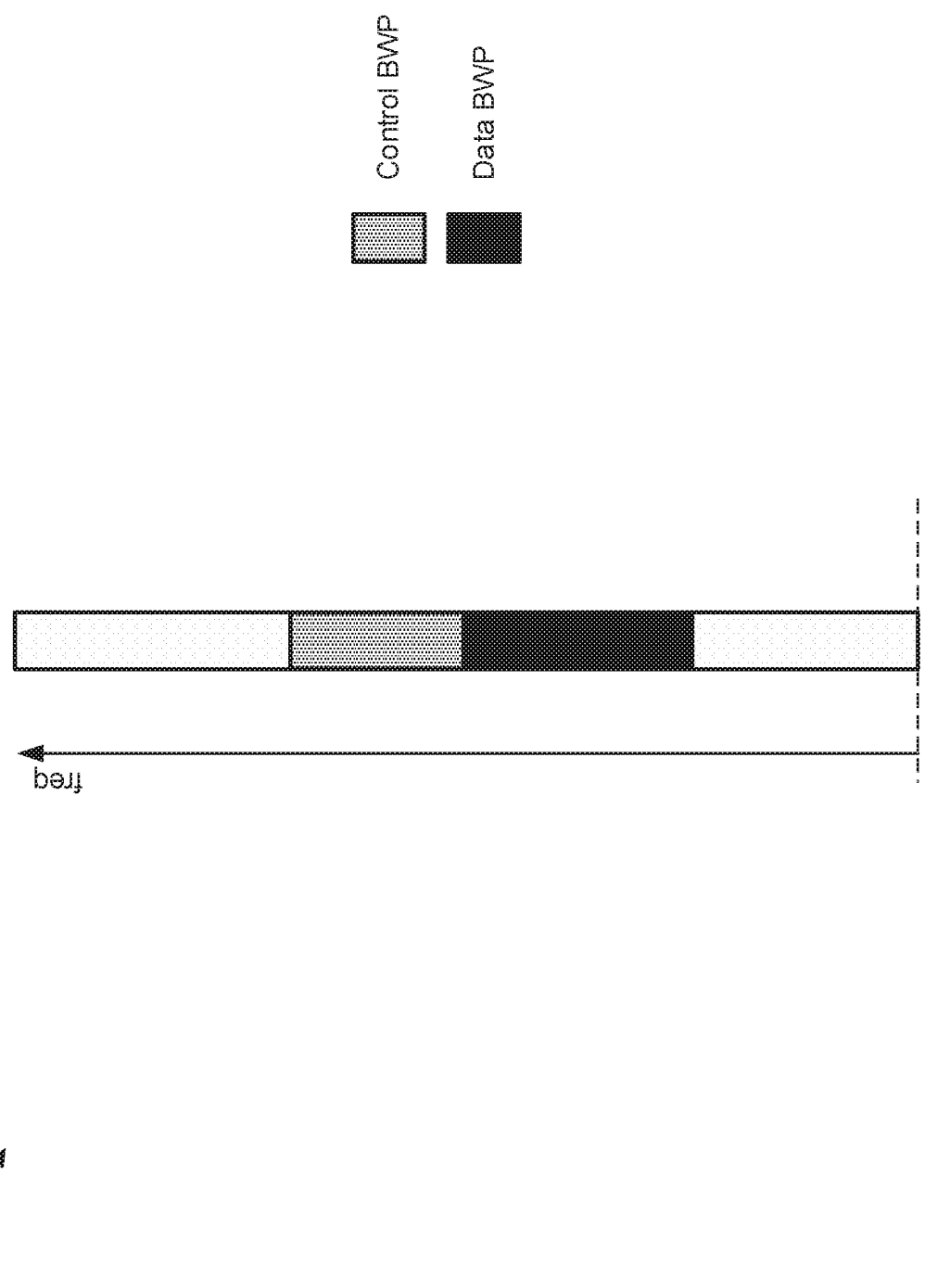
FIG. 6 shows an example of mapping BWPs for control and data channels, in accordance with various aspects of the present disclosure.

FIG. 6 shows an example 600 of mapping BWPs for control and data channels, in accordance with various aspects of the present disclosure.

FIG. 6 shows a BWP mapped to a control channel, such as a PDCCH or a PUCCH. This BWP may be referred to as a control BWP. FIG. 6 also shows a BWP mapped to a data channel, such as a PDSCH or a PUSCH. This BWP may be referred to as a data BWP. The control BWP and the data BWP may be a same size or different sizes. The control BWP and the data BWP may have a same SCS or different SCSs. In some aspects, an SSB or a reference signal (e.g., channel state information reference signal, a tracking reference signal, positioning reference signal, and/or the like) may be mapped to the control BWP and/or the data BWP. In some aspects, a bandwidth and/or a starting physical resource block index may be configured for a control BWP and/or a data BWP by stored configuration information or a radio resource control message.

As indicated above, FIG. 6 is provided as an example. Other examples may differ from what is described with regard to FIG. 6.

Figure 7:
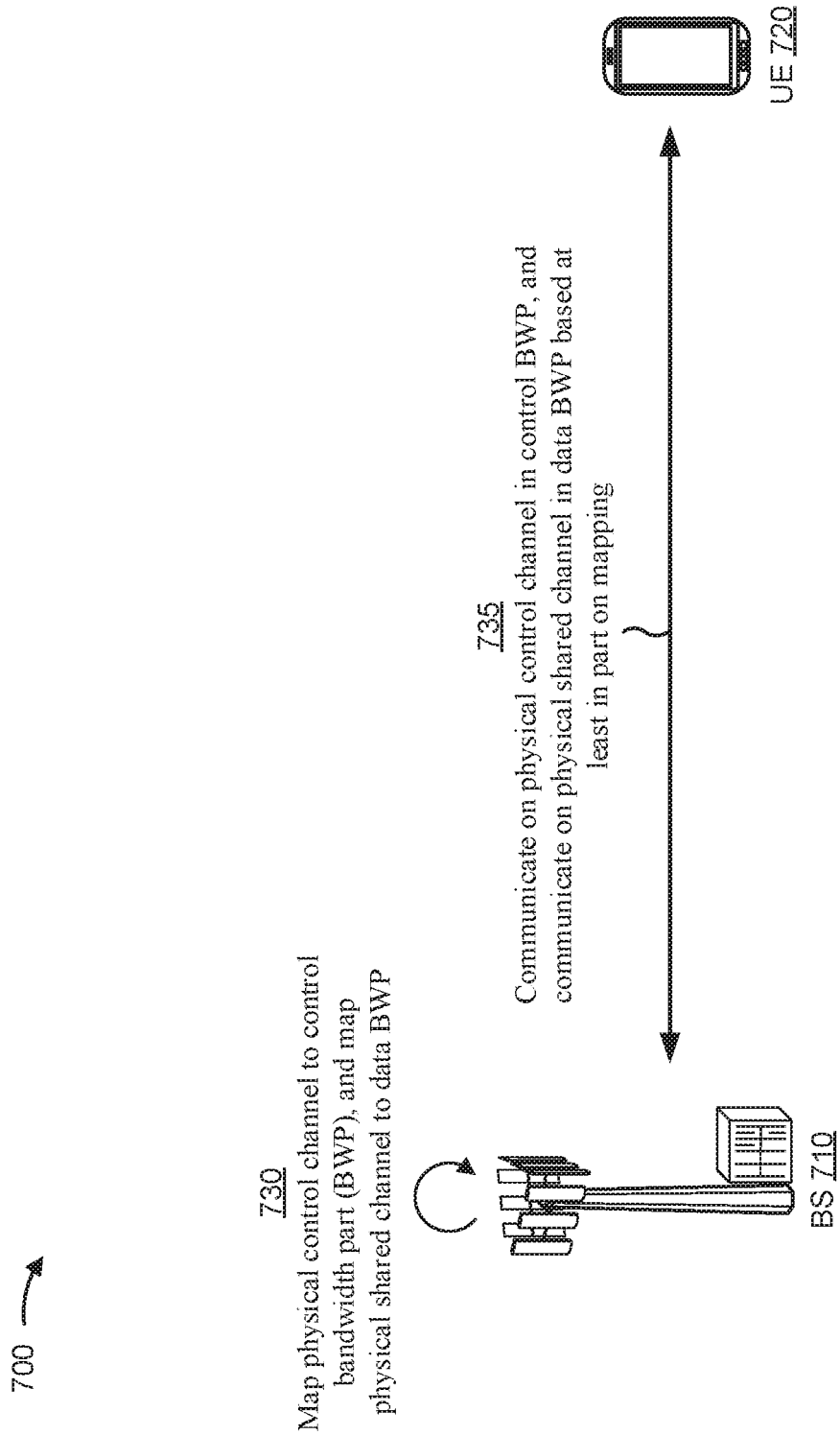
FIG. 7 is a diagram illustrating an example of mapping BWPs for control and data channels, in accordance with various aspects of the present disclosure.

FIG. 7 is a diagram illustrating an example 700 of mapping BWPs for control and data channels, in accordance with various aspects of the present disclosure. FIG. 7 shows a BS 710 (e.g., BS 110 depicted in FIGS. 1 and 2) and a UE 720 (e.g., UE 120 depicted in FIGS. 1 and 2) that may communicate with each other. UE 720 in FIG. 7 may be an NR RedCap UE.

As shown by reference number 730, BS 710 may map a physical control channel to a control BWP and map a physical shared channel to a data BWP. For example, BS 710 may map a PDCCH channel for UE 720 to a BWP designated as the control BWP. BS 710 may map a physical shared channel to a data BWP. For example, BS 710 may map a PDSCH channel for UE 720 to a BWP designated as the data BWP. In some aspects, the control BWP and/or the data BWP may support intra-slot or inter-slot repetition. Additionally, or alternatively, BS 710 may map a PUCCH to a control BWP and map a PUSCH to a data BWP.

In some aspects, BS 710 may indicate BWP mappings to UE 720. Additionally, or alternatively, UE 720 may determine the BWP mappings. For example, UE 720 may map a physical control channel (e.g., PUCCH, PDCCH) to a control BWP and map a physical shared channel (e.g., PUSCH, PDSCH) to a data channel.

As shown by reference number 735, BS 710 and UE 720 may communicate on the physical control channel in the control BWP and communicate on the physical shared channel in the data BWP, based at least in part on the BWP mappings. UE 720 may switch between the control BWP and the data BWP as necessary. The control BWP and the data BWP may be the same or different sizes, and/or may have the same or different SCSs.

In some aspects, BS 710 and/or UE 720 may map reference signals to a control BWP or a data BWP. For example, BS 710 may map a channel state information reference signal (CSI-RS) to a control BWP and/or a data BWP. UE 720 may map a signaling reference signal (SRS) to a control BWP and/or a data BWP.

The control BWP and the data BWP may have different locations or configurations with respect to each other. For example, BWPs may be part of a same component carrier (CC) or a different CC. The control BWP and the data BWP may not overlap or may partially overlap in a frequency domain.

In some aspects, the control BWP and the data BWP may overlap in time. If the control BWP and the data BWP overlap in time, BS 710 or UE 720 may use a priority rule or some other selection criteria to select either the control BWP or the data BWP for activation in one or multiple time slots. The control BWP may be assumed to be active in slots configured for PDCCH monitoring or configured with periodic CSI-RS for beam management or CSI reporting. The data BWP may be assumed to be active in slots with a scheduled PDSCH transmission or configured with periodic CSI-RS for CSI reporting. When both the control BWP and the data BWP are expected to be active in a slot, UE 720 may be required to receive only in one of the control BWP or the data BWP based at least in part on one or more priority rules. In some aspects, the priority rule may include that if the PDSCH is dynamically scheduled, the data BWP takes precedence; otherwise, the control BWP takes precedence. For example, a data BWP activated by a scheduled PDSCH may have priority over a control BWP activated by PDCCH monitoring. A control BWP activated by PDCCH monitoring may have priority over a data BWP activated by a periodic CSI-RS. A data BWP activated by a periodic CSI-RS may have priority over a control BWP activated by a periodic CSI-RS. BS 710 or UE 720 may drop a conflicting BWP that does not have priority. In some aspects, a data BWP or a control BWP may be configured as a default BWP if neither the control BWP nor the data BWP is expected to be active.

In some aspects, UE 720, being an NE RedCap UE, may have a more limited processing ability than an NR Premium UE. UE 720 may have a number of slots during a tuning gap in which UE 720 may retune frequencies when switching between the control BWP and the data BWP. In some aspects, UE 720 may relax or extend the tuning gap for switching between the control BWP and the data BWP. For example, a tuning gap may have existing values K0/K1/K2 that correspond to 1, 2, or more slots. UE 720 may extend the tuning gap by 1, 2 or more slots using various offsets represented by $\Delta_{K1}/\Delta_{K2}/\Delta_{K3}$. In some aspects, UE 720 may have one or more stored look up tables (LUTs) for tuning gaps. UE 720 may receive a message with a pointer to a LUT that identifies a particular tuning gap.

In some aspects, UE 720 may also monitor a PDCCH in the control BWP at certain monitoring occasions. UE 720 may monitor fewer or more occasions based at least in part on a UE capability, which may be limited for an NR RedCap UE. UE 720 may determine the monitoring occasions based at least in part on a message from BS 710 that specifically indicates the monitoring occasions or points to an entry in an LUT for monitoring occasions. In some aspects, UE 720 may receive an indication of a formula for monitoring occasions that is based at least in part on a radio network temporary identifier or a control resource set identifier. UE 720 may thus be dynamically configured for different monitoring occasions. With a relaxed BWP tuning gap and adjusted monitoring occasions, UE 720, being an NR RedCap UE, may communicate with BS 710 without a degradation in communication or added latency.

As indicated above, FIG. 7 is provided as an example. Other examples may differ from what is described with regard to FIG. 7.

Figure 8:
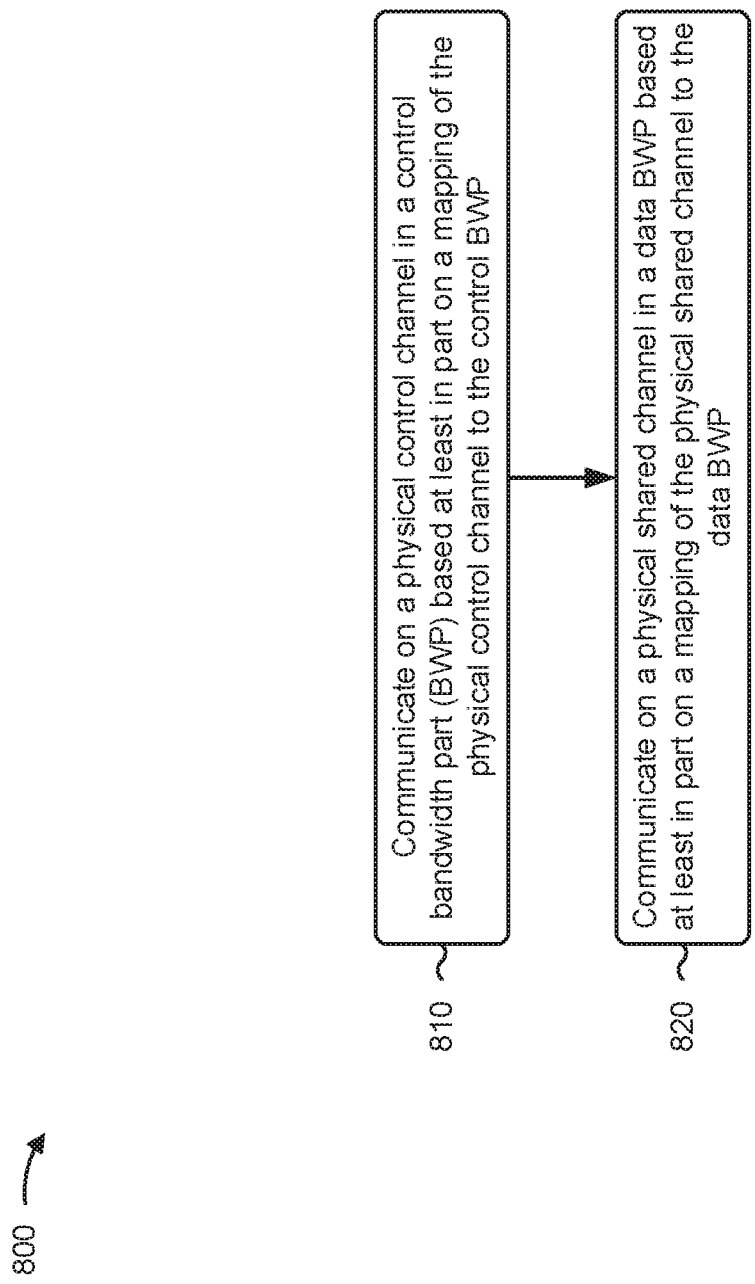
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 depicted in FIGS. 1 and 2, UE 720 depicted in FIG. 7, and/or the like) performs operations associated with mapping BWPs to control and data channels.

As shown in FIG. 8, in some aspects, process 800 may include communicating on a physical control channel in a control BWP based at least in part on a mapping of the physical control channel to the control BWP (block 810). For example, the UE (e.g., using receive processor 258, transmit processor 264, controller/processor 280, memory 282, and/or the like) may communicate on a physical control channel in a control BWP based at least in part on a mapping of the physical control channel to the control BWP, as described above.

As further shown in FIG. 8, in some aspects, process 800 may include communicating on a physical shared channel in a data BWP based at least in part on a mapping of the physical shared channel to the data BWP (block 820). For example, the UE (e.g., using receive processor 258, transmit processor 264, controller/processor 280, memory 282, and/or the like) may communicate on a physical shared channel in a data BWP based at least in part on a mapping of the physical shared channel to the data BWP, as described above.

Process 800 may include additional aspects, such as any single aspect or any combination of aspects described below and/or in connection with one or more other processes described elsewhere herein.

In a first aspect, communicating on the physical control channel in the control BWP includes receiving control information on a physical downlink control channel in the control BWP, and communicating on the physical shared channel in the data BWP includes receiving data on a physical downlink shared channel in the data BWP.

In a second aspect, alone or in combination with the first aspect, communicating on the physical control channel in the control BWP includes transmitting control information on a physical uplink control channel in the control BWP, and communicating on the physical shared channel in the data BWP includes transmitting data on a physical uplink shared channel in the data BWP.

In a third aspect, alone or in combination with one or more of the first and second aspects, one or more of the control BWP or the data BWP supports intra-slot or inter-slot repetition.

In a fourth aspect, alone or in combination with one or more of the first through third aspects, the control BWP and the data BWP do not overlap in a frequency domain.

In a fifth aspect, alone or in combination with one or more of the first through fourth aspects, the control BWP and the data BWP partially overlap in a frequency domain.

In a sixth aspect, alone or in combination with one or more of the first through fifth aspects, the control BWP and the data BWP do not overlap in a time domain.

In a seventh aspect, alone or in combination with one or more of the first through sixth aspects, process 800 includes dropping, based at least in part on a priority rule, one of control information in a time slot or data in the time slot based at least in part on a determination that the control BWP and the data BWP are both expected to be active in the time slot. This may apply to multiple slots.

In an eighth aspect, alone or in combination with one or more of the first through seventh aspects, the priority rule for the time slot specifies at least one of: that the data BWP activated by scheduled data on the physical shared channel has priority over the control BWP activated by physical control channel monitoring; that the control BWP activated by physical control channel monitoring has priority over the data BWP activated by periodic CSI-RS reporting; that the data BWP activated by periodic CSI-RS reporting has priority over the control BWP activated by periodic CSI-RS reporting; a combination thereof.

In a ninth aspect, alone or in combination with one or more of the first through eighth aspects, process 800 includes activating the control BWP or the data BWP in the time slot based at least in part on a default BWP rule and a determination that neither the control BWP nor the data BWP is expected to be active in the time slot according to the priority rule. This may apply to multiple slots.

In a tenth aspect, alone or in combination with one or more of the first through ninth aspects, an SCS for the physical control channel in the control BWP and an SCS for the physical shared channel in the data BWP are different. In some aspects, an SCS for the physical control channel in the control BWP and an SCS for the physical shared channel in the data BWP are the same.

In an eleventh aspect, alone or in combination with one or more of the first through tenth aspects, process 800 includes receiving a radio resource control message that indicates a bandwidth and a starting physical resource block index for one or more of the control BWP or the data BWP.

In a twelfth aspect, alone or in combination with one or more of the first through eleventh aspects, process 800 includes mapping one or more reference signals to one or more of the control BWP or the data BWP.

In a thirteenth aspect, alone or in combination with one or more of the first through twelfth aspects, process 800 includes determining monitoring occasions for monitoring the physical control channel in the control BWP based at least in part on receiving a message that indicates one or more of a pointer to a lookup table for monitoring occasions or a formula for monitoring occasions that is based at least in part on a radio network temporary identifier or a control resource set identifier.

In a fourteenth aspect, alone or in combination with one or more of the first through thirteenth aspects, process 800 includes extending, by one or more slots, a tuning gap for the UE to switch between communicating on the physical control channel in the control BWP and communicating on the physical shared channel in the data BWP.

In a fifteenth aspect, alone or in combination with one or more of the first through fourteenth aspects, process 800 includes determining a tuning gap for the UE to switch between communicating on the physical control channel in the control BWP and communicating on the physical shared channel in the data BWP, based at least in part on a receiving a message that indicates a pointer to a look up table for tuning gaps.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
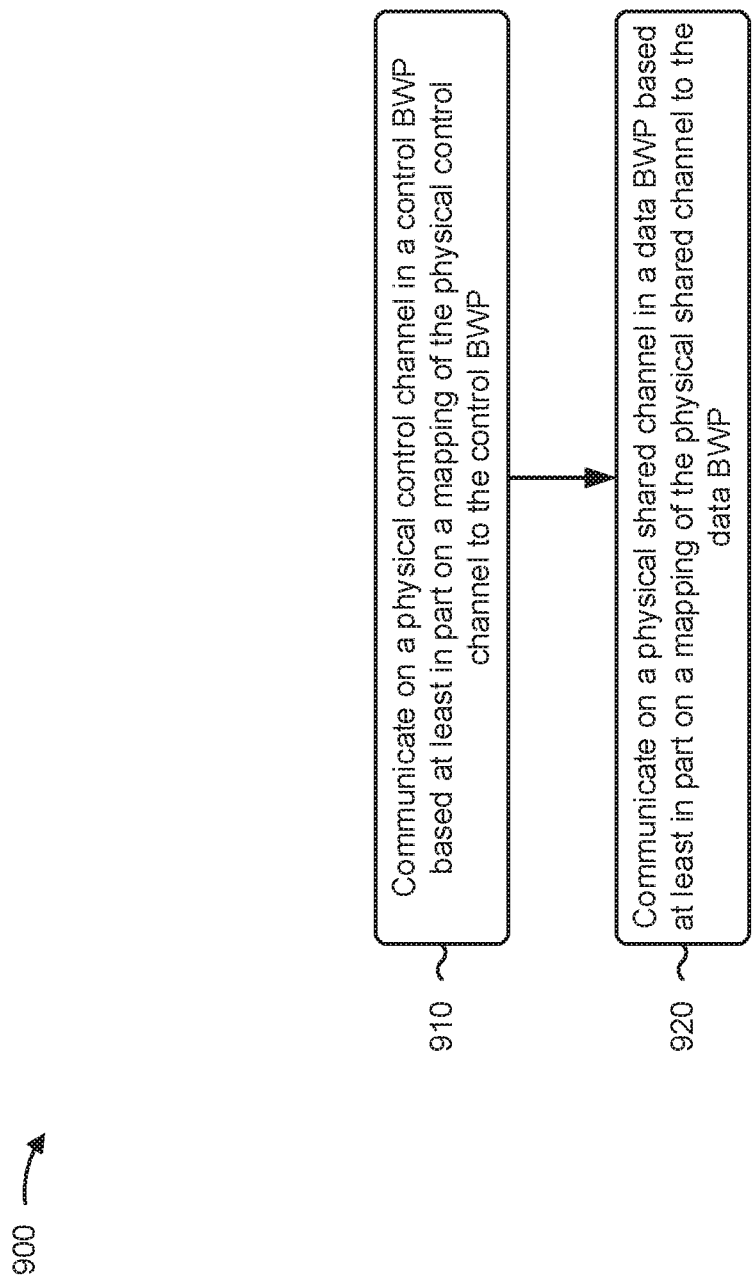
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where the base station (e.g., BS 110 depicted in FIGS. 1 and 2, BS 710 depicted in FIG. 7, and/or the like) performs operations associated with mapping BWPs to control and data channels.

As shown in FIG. 9, in some aspects, process 900 may include communicating on a physical control channel in a control BWP based at least in part on a mapping of the physical control channel to the control BWP (block 910). For example, the base station (e.g., using transmit processor 220, receive processor 238, controller/processor 240, memory 242, and/or the like) may communicate on a physical control channel in a control BWP based at least in part on a mapping of the physical control channel to the control BWP, as described above.

As further shown in FIG. 9, in some aspects, process 900 may include communicating on a physical shared channel in a data BWP based at least in part on a mapping of the physical shared channel to the data BWP (block 920). For example, the base station (e.g., using transmit processor 220, receive processor 238, controller/processor 240, memory 242, and/or the like) may communicate on a physical shared channel in a data BWP based at least in part on a mapping of the physical shared channel to the data BWP, as described above.

Process 900 may include additional aspects, such as any single aspect or any combination of aspects described below and/or in connection with one or more other processes described elsewhere herein.

In a first aspect, communicating on the physical control channel in the control BWP includes transmitting control information on a physical downlink control channel in the control BWP, and communicating on the physical shared channel in the data BWP includes transmitting data on a physical downlink shared channel in the data BWP.

In a second aspect, alone or in combination with the first aspect, communicating on the physical control channel in the control BWP includes receiving control information on a physical uplink control channel in the control BWP, and communicating on the physical shared channel in the data BWP includes receiving data on a physical uplink shared channel in the data BWP.

In a third aspect, alone or in combination with one or more of the first and second aspects, one or more of the control BWP or the data BWP supports intra-slot or inter-slot repetition.

In a fourth aspect, alone or in combination with one or more of the first through third aspects, the control BWP and the data BWP do not overlap in a frequency domain.

In a fifth aspect, alone or in combination with one or more of the first through fourth aspects, the control BWP and the data BWP partially overlap in a frequency domain.

In a sixth aspect, alone or in combination with one or more of the first through fifth aspects, the control BWP and the data BWP do not overlap in a time domain.

In a seventh aspect, alone or in combination with one or more of the first through sixth aspects, process 900 includes dropping, based at least in part on a priority rule, one of control information in a time slot or data in the time slot based at least in part on a determination that the control BWP and the data BWP are both expected to be active in the time slot.

In an eighth aspect, alone or in combination with one or more of the first through seventh aspects, the priority rule for the time slot specifies at least one of: that the data BWP activated by scheduled data on the physical shared channel has priority over the control BWP activated by physical control channel monitoring; that the control BWP activated by physical control channel monitoring has priority over the data BWP activated by periodic CSI-RS reporting; that the data BWP activated by periodic CSI-RS reporting has priority over the control BWP activated by periodic CSI-RS reporting; or a combination thereof.

In a ninth aspect, alone or in combination with one or more of the first through eighth aspects, process 900 includes activating the control BWP or the data BWP in the time slot based at least in part on a default BWP rule and a determination that neither the control BWP nor the data BWP is expected to be active in the time slot according to the priority rule.

In a tenth aspect, alone or in combination with one or more of the first through ninth aspects, an SCS for the physical control channel in the control BWP and an SCS for the physical shared channel in the data BWP are different. In some aspects, an SCS for the physical control channel in the control BWP and an SCS for the physical shared channel in the data BWP are the same.

In an eleventh aspect, alone or in combination with one or more of the first through tenth aspects, process 900 includes transmitting a radio resource control message that indicates a bandwidth and a starting physical resource block index for one or more of the control BWP or the data BWP.

In a twelfth aspect, alone or in combination with one or more of the first through eleventh aspects, process 900 includes comprising mapping a synchronization signal and physical broadcast channel signal to one or more of the control BWP or the data BWP.

In a thirteenth aspect, alone or in combination with one or more of the first through twelfth aspects, process 900 includes transmitting a message that indicates one or more of a pointer to a lookup table for monitoring occasions for a UE to monitor the physical control channel in the control BWP or a formula for monitoring occasions that is based at least in part on a radio network temporary identifier or a control resource set identifier.

In a fourteenth aspect, alone or in combination with one or more of the first through thirteenth aspects, process 900 includes extending, by one or more slots, a tuning gap for switching between communicating on the physical control channel in the control BWP and communicating on the physical shared channel in the data BWP.

In a fifteenth aspect, alone or in combination with one or more of the first through fourteenth aspects, process 900 includes transmitting a message to a UE that indicates a pointer to a look up table that the UE uses to select a tuning gap for switching between communicating on the physical control channel in the control BWP and communicating on the physical shared channel in the data BWP.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

Further disclosure is included in the appendix. The appendix is provided as an example only, and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   communicating on a physical control channel in a control bandwidth part (BWP) based at least in part on a mapping of the physical control channel to the control BWP;
   communicating on a physical shared channel in a data BWP based at least in part on a mapping of the physical shared channel to the data BWP;
   determining a tuning gap for the UE to switch between communicating on the physical control channel in the control BWP and communicating on the physical shared channel in the data BWP, based at least in part on receiving a message that indicates a pointer to a look up table for tuning gaps, wherein the look up table for the tuning gaps is stored at the UE; and
   extending, by two or more slots, the tuning gap for the UE to switch between communicating on the physical control channel in the control BWP and communicating on the physical shared channel in the data BWP.

2. The method of claim 1, wherein communicating on the physical control channel in the control BWP includes receiving control information on a physical downlink control channel in the control BWP, and wherein communicating on the physical shared channel in the data BWP includes receiving data on a physical downlink shared channel in the data BWP.

3. The method of claim 1, wherein communicating on the physical control channel in the control BWP includes transmitting control information on a physical uplink control channel in the control BWP, and wherein communicating on the physical shared channel in the data BWP includes transmitting data on a physical uplink shared channel in the data BWP.

4. The method of claim 1, wherein one or more of the control BWP or the data BWP supports intra-slot or inter-slot repetition.

5. The method of claim 1, wherein the control BWP and the data BWP do not overlap in a frequency domain.

6. The method of claim 1, wherein the control BWP and the data BWP partially overlap in a frequency domain.

7. The method of claim 1, wherein the control BWP and the data BWP do not overlap in a time domain.

8. The method of claim 1, further comprising dropping, based at least in part on a priority rule, one of control information in a time slot or data in the time slot based at least in part on a determination that the control BWP and the data BWP are both expected to be active in the time slot.

9. The method of claim 8, wherein the priority rule for the time slot specifies at least one of:
   that a data BWP activated by scheduled data on the physical shared channel has priority over a control BWP activated by physical control channel monitoring;
   that the control BWP activated by physical control channel monitoring has priority over a data BWP activated by periodic channel state information reference signal (CSI-RS) reporting;
   that the data BWP activated by periodic CSI-RS reporting has priority over a control BWP activated by periodic CSI-RS reporting; or
   a combination thereof.

10. The method of claim 8, further comprising activating the control BWP or the data BWP in the time slot based at least in part on a default BWP rule and a determination that neither the control BWP nor the data BWP is expected to be active in the time slot according to the priority rule.

11. The method of claim 1, wherein a subcarrier spacing (SCS) for the physical control channel in the control BWP and an SCS for the physical shared channel in the data BWP are different.

12. The method of claim 1, further comprising receiving a radio resource control message that indicates a bandwidth and a starting physical resource block index for one or more of the control BWP or the data BWP.

13. The method of claim 1, further comprising mapping one or more reference signals to one or more of the control BWP or the data BWP.

14. The method of claim 1, further comprising determining monitoring occasions for monitoring the physical control channel in the control BWP based at least in part on receiving a message that indicates one or more of a pointer to a look up table for the monitoring occasions or a formula for the monitoring occasions that is based at least in part on a radio network temporary identifier or a control resource set identifier.

15. The method of claim 1, further comprising relaxing, by the two or more slots, the tuning gap for the UE to switch between communicating on the physical control channel in the control BWP and communicating on the physical shared channel in the data BWP.

16. The method of claim 1, wherein the UE is a reduced capability UE.

17. The method of claim 1, wherein a same component carrier (CC) comprises the control BWP and the data BWP.

18. A method of wireless communication performed by a base station, comprising:
   communicating on a physical control channel in a control bandwidth part (BWP) based at least in part on a mapping of the physical control channel to the control BWP;
   communicating on a physical shared channel in a data BWP based at least in part on a mapping of the physical shared channel to the data BWP;
   transmitting, to a user equipment (UE), a message that indicates a pointer to a look up table that the UE uses to select a tuning gap for switching between communicating on the physical control channel in the control BWP and communicating on the physical shared channel in the data BWP, wherein the look up table is stored at the UE; and extending, by two or more slots, the tuning gap for switching between communicating on the physical control channel in the control BWP and communicating on the physical shared channel in the data BWP.

19. The method of claim 18, wherein communicating on the physical control channel in the control BWP includes transmitting control information on a physical downlink control channel in the control BWP, and wherein communicating on the physical shared channel in the data BWP includes transmitting data on a physical downlink shared channel in the data BWP.

20. The method of claim 18, wherein communicating on the physical control channel in the control BWP includes receiving control information on a physical uplink control channel in the control BWP, and wherein communicating on the physical shared channel in the data BWP includes receiving data on a physical uplink shared channel in the data BWP.

21. The method of claim 18, wherein one or more of the control BWP or the data BWP supports intra-slot or inter-slot repetition.

22. The method of claim 18, wherein the control BWP and the data BWP do not overlap in a frequency domain.

23. The method of claim 18, wherein the control BWP and the data BWP partially overlap in a frequency domain.

24. The method of claim 18, wherein the control BWP and the data BWP do not overlap in a time domain.

25. The method of claim 18, further comprising dropping, based at least in part on a priority rule, one of control information in a time slot or data in the time slot based at least in part on a determination that the control BWP and the data BWP are both expected to be active in the time slot.

26. The method of claim 25, wherein the priority rule for the time slot specifies at least one of:
that a data BWP activated by scheduled data on the physical shared channel has priority over a control BWP activated by physical control channel monitoring;
that the control BWP activated by physical control channel monitoring has priority over a data BWP activated by periodic channel state information reference signal (CSI-RS) reporting;
that the data BWP activated by periodic CSI-RS reporting has priority over a control BWP activated by periodic CSI-RS reporting; or
a combination thereof.

27. The method of claim 25, further comprising activating the control BWP or the data BWP in the time slot based at least in part on a default BWP rule and a determination that neither the control BWP nor the data BWP is expected to be active in the time slot according to the priority rule.

28. The method of claim 18, wherein a subcarrier spacing (SCS) for the physical control channel in the control BWP and an SCS for the physical shared channel in the data BWP are different.

29. The method of claim 18, further comprising transmitting a radio resource control message that indicates a bandwidth and a starting physical resource block index for one or more of the control BWP or the data BWP.

30. The method of claim 18, further comprising mapping a synchronization signal and physical broadcast channel signal to one or more of the control BWP or the data BWP.

31. The method of claim 18, further comprising transmitting a message that indicates one or more of a pointer to a look up table for monitoring occasions for the UE to monitor the physical control channel in the control BWP or a formula for the monitoring occasions that is based at least in part on a radio network temporary identifier or a control resource set identifier.

32. The method of claim 18, further comprising relaxing, by the two or more slots, the tuning gap for switching between communicating on the physical control channel in the control BWP and communicating on the physical shared channel in the data BWP.

33. A user equipment (UE) for wireless communication, comprising:
one or more memories; and
one or more processors coupled to the one or more memories, the one or more memories and the one or more processors configured to:
communicate on a physical control channel in a control bandwidth part (BWP) based at least in part on a mapping of the physical control channel to the control BWP;
communicate on a physical shared channel in a data BWP based at least in part on a mapping of the physical shared channel to the data BWP;
determine, a tuning gap for the UE to switch between communicating on the physical control channel in the control BWP and communicating on the physical shared channel in the data BWP, based at least in part on receiving a message that indicates a pointer to a look up table for tuning gaps, wherein the look up table for the tuning gaps is stored at the UE; and
extend, by two or more slots, the tuning gap for the UE to switch between communicating on the physical control channel in the control BWP and communicating on the physical shared channel in the data BWP.

34. A base station for wireless communication, comprising:
one or more memories; and
one or more processors coupled to the one or more memories, the one or more memories and the one or more processors configured to:
communicate on a physical control channel in a control bandwidth part (BWP) based at least in part on a mapping of the physical control channel to the control BWP;
communicate on a physical shared channel in a data BWP based at least in part on a mapping of the physical shared channel to the data BWP;
transmit, to a user equipment (UE), a message that indicates a pointer to a leek-up look up table that the UE uses to select a tuning gap for switching between communicating on the physical control channel in the control BWP and communicating on the physical shared channel in the data BWP, wherein the look up table is stored at the UE; and
extend, by two or more slots, the tuning gap for switching between communicating on the physical control channel in the control BWP and communicating on the physical shared channel in the data BWP.

* * * * *